Re 501

Edward F Woodward
Ladies Skirt
Reissued Sep. 29. 1891

UNITED STATES PATENT OFFICE.

EDWARD F. WOODWARD, OF NEW YORK, N. Y.

IMPROVEMENT IN LADIES' SKIRTS.

Specification forming part of Letters Patent No. 17,602, dated June 16, 1857; Reissue No. 501, dated September 29, 1857.

*To all whom it may concern:*

Be it known that I, EDWARD F. WOODWARD, of Brooklyn, in the county of Kings and State of New York, have invented certain improved hoops to be used in ladies' skirts and bustles for stiffening the same; and I do hereby declare the following to be a full, clear, and exact description thereof, reference being had to the accompanying drawings, in which—

Figure 1:
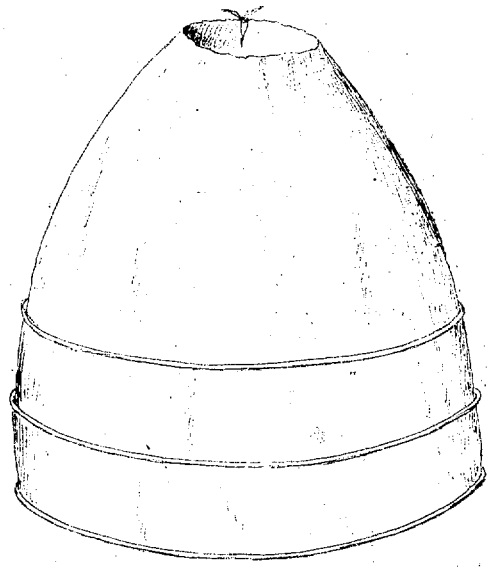
Figure 3:
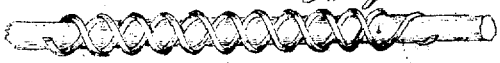
Figure 2:
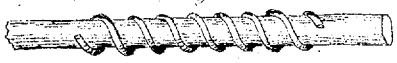
Figure 4:
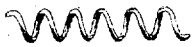

Figure 1 is a skirt with the hoops inserted therein. Fig. 2 is a section of a cord with a spiral wound around it. Fig. 3 is a cord with two spirals wound around it in contrary directions. Fig. 4 is a spiral without any center cord or support.

Heretofore the mode adopted in the present fashion of hooped skirts to set them off has been to form the hoops of whalebone in strips curved into hoops, or rattan or brass or steel strips, and sometimes coarser and heavier materials. All of these as employed before my invention were defective. They were rigid in their outline, and do not permit an easy graceful flow of the drapery of a lady's dress, so essential to beauty of costume; and when a dress thus supported is acted upon by the wind such hoops show conspicuously and inelegantly, besides which, in sitting down it is impossible with such hoops to gather the dress in, and by severe compression the hoops are bent or broken so as to spoil their shape. I effectually remedy these defects by my improvements, and form a light, pliable, elastic, and buoyant hoop, which has all the necessary powers of extension for the purpose, and at the same time an elasticity and pliability not found in hoops heretofore found in the market.

The nature of my invention consists in forming hoops of spiral wire, strips of rattan, whalebone, or other suitable material, either with or without the interior support of a cord or strip of any kind, which hoops when inserted in ladies' skirts shall have the effect of expanding said skirts, while they can be compressed or bent short without serious injury to their configuration.

The construction is as follows: I take thin, narrow strips of rattan, (*Calamus ratang*,) or whalebone, or metallic wire, or other stiff elastic material proper for the purpose and wind it around a cord of hemp or other material, or I form it into a spiral on a proper mandrel of any kind, making it into a cord of spiral construction, as shown in the figures, where in Figs. 2, 3, 4 several modifications are shown. The spirals in these figures are drawn somewhat separated, to show more clearly; but they may be laid close together, and of any desired diameter to suit the wants of the public. The center of this hollow spiral may be filled with such material as shall be found convenient; or it may be used without any, although I deem the center support best, so the spiral may be formed of one or more strands without changing the device.

When rattan strips are used, they are steamed to soften them before forming, and after forming they are dried, which sets them in place. To render this cord thus formed waterproof, I saturate it with a solution of gum-lac, which adds increased stiffness and durability and prevents the material becoming limber by wear.

Having thus fully set forth my new hoop for ladies' skirts and the various modifications thereof and the manner of making the same, what I claim therein as new, and for which I desire to secure the exclusive right, is—

Constructing hoops intended for ladies' dresses substantially as and for the purposes set forth, consisting of a spiral formed of any proper material, metallic or vegetable, as described, either with or without a cord to support the same, which can be bent into the form of a hoop and inserted into ladies' skirts, as herein fully made known.

In testimony whereof I have hereunto set my hand.

EDWARD F. WOODWARD.

In presence of—

EDWIN B. LARCHAR,
GEO. W. WEST.